United States Patent [19]

Hsing

[11] Patent Number: 4,648,089

[45] Date of Patent: Mar. 3, 1987

[54] DIGITAL VOICE SUMMING FOR TELECONFERENCING

[75] Inventor: To R. Hsing, Sudbury, Mass.

[73] Assignee: GTE Laboratories, Inc., Waltham, Mass.

[21] Appl. No.: 666,052

[22] Filed: Oct. 29, 1984

[51] Int. Cl.$^4$ .................... H04M 3/56; H04Q 11/04
[52] U.S. Cl. ........................................ 370/62; 379/202
[58] Field of Search ...................... 370/62; 179/18 BC

[56] References Cited

U.S. PATENT DOCUMENTS

| | | | |
|---|---|---|---|
| 4,254,497 | 3/1981 | Funderburr et al. | 370/62 |
| 4,359,603 | 11/1982 | Heaton | 370/62 |
| 4,387,457 | 6/1983 | Münter | 370/62 |
| 4,488,291 | 12/1984 | Eschmann et al. | 370/62 |
| 4,499,578 | 2/1985 | Marouf et al. | 370/62 |

FOREIGN PATENT DOCUMENTS 3329779 3/1985 Fed. Rep. of Germany ........ 370/62

OTHER PUBLICATIONS

Satyan G. Pitroda and Bernard J. Rekiere, "A Digital Conference Circuit for an Instant Speaker Algorithm", *Transaction of Communication Technology*, vol. Com-19, No. 6, pp. 1069–1076, Dec. 1971.

*Primary Examiner*—Thomas W. Brown
*Attorney, Agent, or Firm*—Hamilton, Brook, Smith & Reynolds

[57] ABSTRACT

Digitally encoded voice signals are weighted dynamically in multipliers prior to summation of the digital signals. Greater weight is given to the more active channels. In one system, the signals are weighted proportionately to the square of the amplitude of each digital voice signal.

7 Claims, 2 Drawing Figures

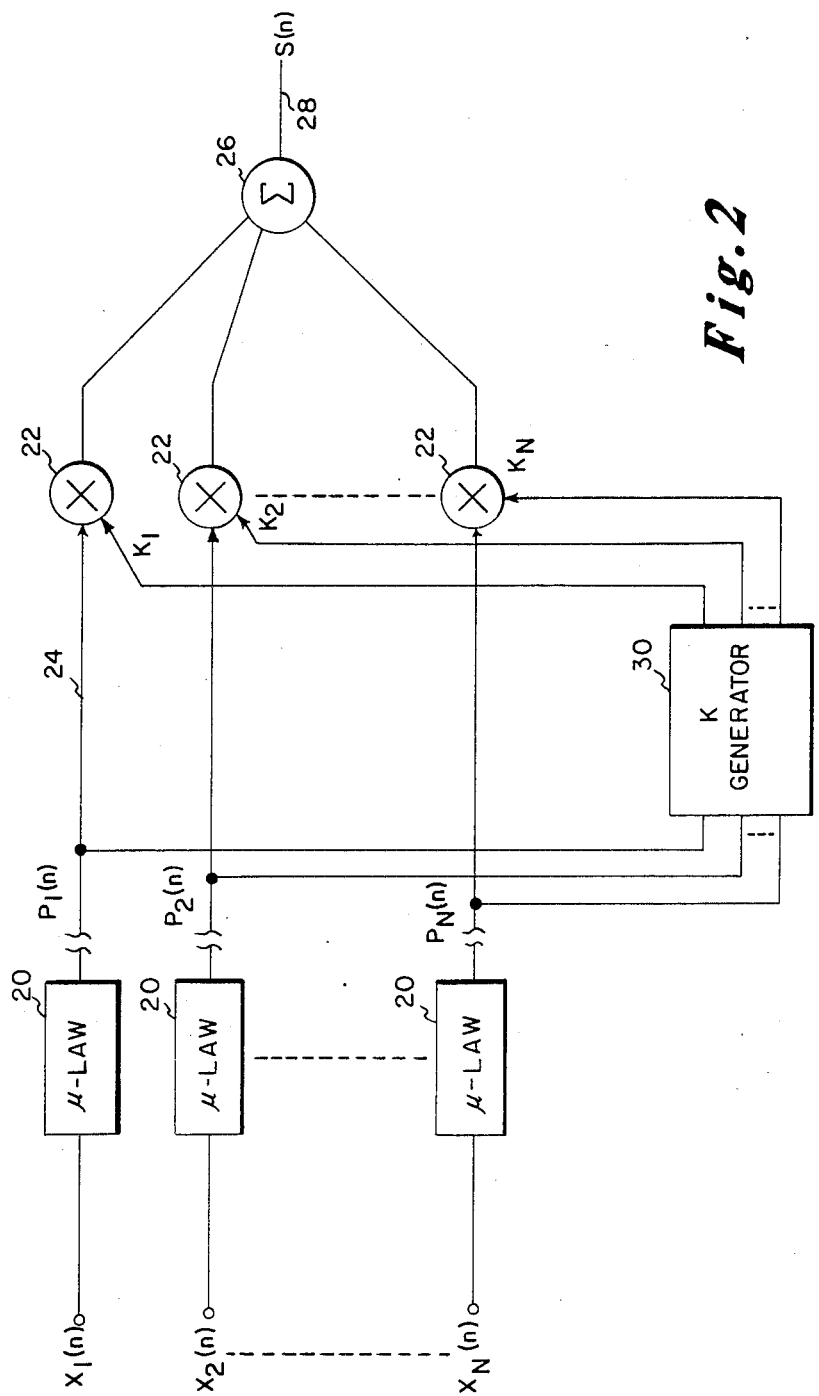

DIGITAL VOICE SUMMING FOR TELECONFERENCING

RELATED APPLICATION

U.S. Ser. No. 666,042, Framed Digital Voice Summing for Teleconferencing, filed by T. Russell Hsing, Oct. 29, 1984.

TECHNICAL FIELD

The present invention relates to a electronic signal processing and in particular to the summing of digital voice signals in telephone conferencing.

BACKGROUND

In telephone conferencing a number of voice signals from each telephone set involved in the conference must be combined and transmitted back to each of the telephone sets. The number of voice signals can be combined at a central exchange for example. With conventional analog telephones, the combination of the signals is straightforward. The several signals need only be summed together. To avoid overdrive of the final signal, each summed signal is generally reduced by an amount proportional to the number of signals being combined. For example, in a three-way conference, one-third of each signal is summed.

Conventional analog telephones are being replaced by digital telephones. In such systems, the analog signals are sampled at each telephone set at a rate of twice the band width of the analog signal or about eight kilohertz. Each sample is then quantized as one of a discrete set of prechosen values and encoded as a digital word which is then transmitted over the telephone lines. With eight bit digital words, for example, the analog sample is quantized to $2^8$ or 256 levels, each of which is designated by a different eitht bit word. In linear pulse code modulation (PCM) systems, the 256 possible values of the digital word are linearly related to corresponding analog amplitudes. As a result, the digital values can be summed as with the combination of analog signals.

Because most speech is found at the lower analog signal amplitudes, encoding techniques have been developed which maintain high resolution at the lower amplitudes but which provide lesser resolution at higher amplitudes. Such approaches reduce the number of bits required in each word. An example of such an encoding technique is the $\mu$ law technique by which the quantization levels are based on a logarithmic function. As a result of the nonlinear relationship between the encoded digital signals and the underlying analog voice signals, the digital signals cannot simply be proportionately reduced and summed. Such direct summation results in severe distortion. Typically, as shown in FIG. 1, such $\mu$ law encoded signals which must be combined for teleconferencing are first converted back to analog signals through an inverse $\mu$ law device 12 and the analog signals are summed in summer 14. The resultant combined signals are then again encoded through a $\mu$ law encoder 16. This approach introduces extra quantization noise and more hardware implementation due to the extra conversion from digital to analog and back to digital.

An alternative to reverting back to analog form is to determine an "Active Speaker" by comparing each conferee's digital samples during each of sequential time frames. Once the active speaker is determined, only the digital voice signal from that speaker is transmitted to the others through a time frame. Such an approach can result in chopping of words as the active speaker status is passed from one conferee to another and does prevent simultaneous transmission from multiple speakers.

DISCLOSURE OF THE INVENTION

The present invention allows for the direct summation of $\mu$ law and other nonlinear encoded signals by activity weighting the incoming signals. A multiplier is generated for each digital voice signal to be summed as a function of the comparative levels of the signals. The sum of the multipliers is no greater than about one to preclude overdrive of the output. Each digital signal is then digitally multiplied with its respective multiplier to weight the signal before it is applied to a digital summer. The most active signal, that is the one with the greatest amplitude, is given the most weight.

In a preferred form of the invention, a multiplier is generated for each sample of each digital signal. The multiplier for a particular signal is the ratio of a function of that signal to the sum, for all of the voice signals, of the same function of each digital signal. In particular, the function is the square of the digital signal. In this approach, multiplier $K_j$, for each sample of each digital signal $P_j(n)$ of N digital voice signals, is generated according to the algorithm:

$$K_j(n) = \frac{P_j(n)^2}{\sum_{i=1}^{N} P_i(n)^2} ; j = 1, 2, \ldots N$$

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a schematic diagram of a system embodying the present invention

DESCRIPTION OF PREFERRED EMBODIMENTS

Figure 1:
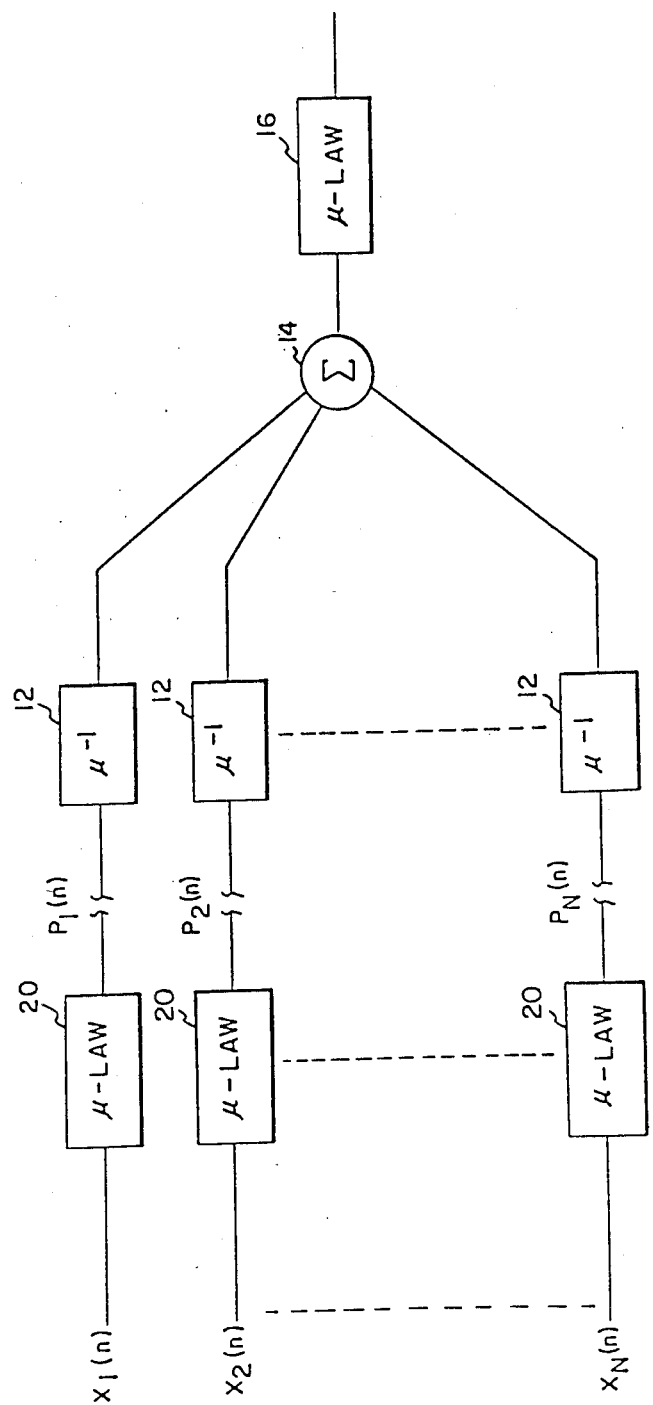
FIG. 1 is a schematic illustration of a prior art approach to voice summing of $\mu$ law encoded signals.

As shown in FIG. 2, a plurality of sampled signals $X_j(n)$ are converted to digital voice signals $P_j(n)$ by $\mu$ law encoders 20 of respective conferee telephone sets. Those digital signals are transmitted to, for example, a central exchange where they are to be combined. In accordance with the present invention, each digital signal $P_j$ is applied to a digital multiplier 22 where it is multiplied by a weighting multiplier $K_j$. For example, with an 8 bit $\mu$ law encoded word on line 24, the value of the 8 bit word, between 0 and 255, is multiplied by a constant $K_1$. The weighted outputs of the multipliers are applied to a digital summer 26 to provide a combined digital voice signal $S(n)$ on line 28, where $$S(n) = K_1(n)P_1(n) + K_2(n)P_2(n) + \ldots + K_N(n)P_N(n)$$

and $$K_1 + K_2 + \ldots + K_N = 1$$

The weighting multipliers are generated in a K generator 30 according to some predetermined algorithm which gives greater weight to the more active channels. In a preferred embodiment the K values are chosen such that:

$$K_j(n) = \frac{P_j(n)^2}{\sum_{i=1}^{N} P_i(n)^2} \; ; j = 1, 2, \ldots N \quad (1)$$

By weighting the digital voice signals as a function of the digital values of those signals, lesser portions of the low level signals, which are considered less active, are provided to the summing circuit 26. Distortion in the combined signal due to the nonlinearities of the $\mu$ law coding can be substantially avoided while still providing some of the less active signals on the line. Providing portions of the less active channels minimizes chopping of words as conferees become more dominant and also provides some signal from the less dominant conferees throughout a conversation.

The present invention is not limited to $\mu$ law encoding. For example, in feed-forward adaptive PCM companders, both a code word P(n) and the gain G(n) are transmitted. The gain estimate signal G is inversely related to the activity of the conferee. Thus, the digital voice signal having the lower G value is given greater wait in the summation.

The summed signal is also calculated by:

$$S(n) = K_1(n)P_1(n) + K_2(n)P_2(n) + \ldots + K_N(n)P_N(n)$$

where $$K_1(n) + K_2(n) + \ldots + K_N(n) = 1$$

and $K_j(n)$ is computed from equation (1). The transmitted gain estimation $G_s(n)$ can be obtained through a separate summer such that $$G_s(n) = L_1 G_1(n) + L_2 G_2(n) + \ldots + L_N G_N(n)$$

where $$L_j(n) = \frac{G_j(n)}{\sum_{i=1}^{N} G_i(n)} \; ; j = 1, 2, \ldots, N$$

Another adaptive PCM compandor, called feedback adaptive PCM compandor, can also be used with this invention. In this scheme, the gain estimation G(n) is based on the past value of the code words P(n). Only code words P(n) are transmitted in this scheme. Suppose that there are N people speaking simultaneously, the summed signal is calculated by $$S(n) = K_1(n)P_1(n) + K_2(n)P_2(n) + \ldots + K_N(n)P(n)$$

where $K_1(n), K_2(n), \ldots, K_N(n)$ follow equation (1) shown in the $\mu$ law case. At the decoder side, the gain estimation can be simply estimated by the past values of the received summed signal.

It is not necessary that a multiplier be generated for each sample or that the weighting constants closely relate to either the underlying analog samples or the actual digital values. For example, in an approach described in a copending application Ser. No. 662,042 filed on even date herewith entitled "Framed Digital Voice Summing for Teleconferencing" a system is described in which the most active channel, as determined by average activity through a number of samples, is given a dominant weighting for a frame of multiple samples. For example, the most active channel may be weighted with a constant K greater than 0.8 and all other channels are weighted by constants of less than 0.2. By proper selection of the frame lengths, preferably in the order of milliseconds, multiple conferees can be understood with minimal distortion even though only one conferee dominates each frame.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. Electronic signal processing apparatus for combining digital voice signals in teleconferencing comprising:
   multiplier generator means for generating a multiplier for each of the digital voice signals as a function of the comparative levels of the signals;
   digital multiplier means for multiplying each digital voice digital with its respective multiplier; and
   digital summing means for summing the outputs of the multiplier means.

2. Electronic signal processing means as claimed in claim 1 wherein the multiplier generator means generates multipliers, the sum of which is about one.

3. Electronic signal processing apparatus as claimed in claim 1 wherein the multiplier generator means generates each multiplier for each digital signal as the ratio of a function of that digital signal to the sum, for all of the voice signals, of such functions of all of the digital voice signals.

4. Electronic signal processing apparatus as claimed in claim 3 wherein said function of said multiplier generator means is the square of the digital signal.

5. The electronic signal processing apparatus as claimed in claim 1 wherein the multiplier generator means generates an individual multiplier for each sample of each digital signal.

6. Electronic signal processing apparatus as claimed in claim 1 further comprising $\mu$ law encoders for encoding the digital voice signals.

7. Electronic signal processing apparatus for combining N number of digital voice signals having a nonlinear relationship to underlying analog voice signals comprising:
   multiplier generator means for generating a multiplier $K_j$ for each sample of each digital signal $P_j(n)$ of the N digital voice signals such that:

$$K_j(n) = \frac{P_j(n)^2}{\sum_{i=1}^{N} P_i(n)^2} \; ; j = 1, 2, \ldots N$$

digital multiplier means for multiplying each digital signal $P_j(n)$ with the generated $K_j(n)$; and
   digital summing means for summing the outputs of the multiplier means.

* * * * *